United States Patent [19]

Albrecht et al.

[11] 3,929,802
[45] Dec. 30, 1975

[54] BIS-BASIC ETHERS OF DIBENZOFURAN
[75] Inventors: William L. Albrecht; Robert W. Fleming, both of Cincinnati, Ohio
[73] Assignee: Richardson-Merrell Inc., Wilton, Conn.
[22] Filed: Feb. 25, 1974
[21] Appl. No.: 446,194

Related U.S. Application Data
[63] Continuation of Ser. No. 45,578, June 11, 1970, abandoned.

[52] U.S. Cl... 260/293.58; 260/246 B; 260/268 TR; 260/326.5 C; 260/346.2 M; 260/999
[51] Int. Cl.² .................................. C07D 307/91
[58] Field of Search..... 260/246 B, 268 TR, 293.58, 260/326.5 C, 346.2 M

[56] References Cited
UNITED STATES PATENTS
3,673,191   6/1972   Albrecht et al................ 260/293.57

OTHER PUBLICATIONS
Burger, Medicinal Chemistry, Vol. I (1951), pp. 45 & 48.

Primary Examiner—G. Thomas Todd
Attorney, Agent, or Firm—George W. Rauchfuss, Jr.

[57] ABSTRACT
The novel bis-basic ethers of dibenzofuran of the present invention have useful antiviral properties. These new compounds are represented by the formula

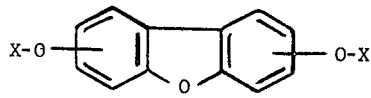

Formula I wherein each X is
A. the group

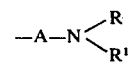

wherein each A is a straight or branched alkylene chain having from 2 to 6 carbon atoms and which separates the amino nitrogen and oxygen by at least 2 carbon atoms; R and R¹ are individually hydrogen, lower alkyl having from 1 to 6 carbon atoms, cycloalkyl having from 3 to 6 carbon atoms, alkenyl having from 3 to 6 carbon atoms and having the vinyl unsaturation in other than the 1-position of the alkenyl group; or each set of R and R¹ taken together with the nitrogen atom to which they are attached is a saturated monocyclic heterocyclic group such as pyrrolidino, piperidino, morpholino, or N-(lower)alkylpiperazino; or
B. the group

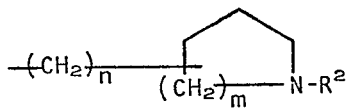

wherein $n$ is a whole integer of from 0 to 2, $m$ is 1 or 2, and R² is hydrogen, lower alkyl having from 1 to 6 carbon atoms, or alkenyl of from 3 to 6 carbon atoms and having the vinyl unsaturation in other than the 1-position of the alkenyl group.

This invention also includes pharmaceutically acceptable acid addition salts of the base compounds represented by Formula I. These new compounds may be prepared by several different methods which are described.

13 Claims, No Drawings

BIS-BASIC ETHERS OF DIBENZOFURAN

This is a continuation of application Ser. No. 45,578, filed June 11, 1970, now abandoned.

This invention relates to new bis-basic ethers of dibenzofuran which have useful antiviral properties and to processes for preparing the same.

The new compounds of this invention are represented by the general formula

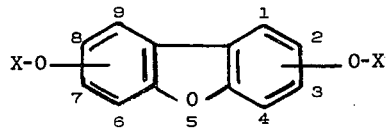

Formula I wherein each X is
A. the group

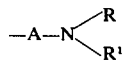

wherein each A is a straight or branched alkylene chain having from 2 to 6 carbon atoms and which separates the amino nitrogen and the ether oxygen by at least 2 carbon atoms; R and R¹ are individually hydrogen, lower alkyl having from 1 to 6 carbon atoms, cycloalkyl of from 3 to 6 carbon atoms, alkenyl of 3 to 6 carbon atoms and having the vinyl unsaturation in other than the 1-position of the alkenyl group; or each set of R and R¹ taken together with the nitrogen atom to which they are attached is a saturated monocyclic heterocyclic group such as pyrrolidino, piperidino, morpholino, or N-(lower)alkylpiperazino; or B. the group

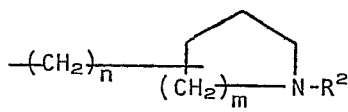

wherein $n$ is a whole integer of from 0 to 2, $m$ is 1 or 2, and R² is hydrogen, lower alkyl having from 1 to 6 carbon atoms, or alkenyl of from 3 to 6 carbon atoms and having the vinyl unsaturation in other than the 1-position of the alkenyl group.

The compounds of this invention include both the base form represented by Formula I and pharmaceutically acceptable acid addition salts of the base form.

As can be seen from the above general Formula I, one basic ether group, that is, —O—X, is attached to each of the two benzenoid rings of the dibenzofuran ring system. Thus one of these groups can be linked to the dibenzofuran ring system by replacement of any one of the hydrogen atoms in positions 1 through 4, while the second of these groups can replace any one of the hydrogen atoms in positions 6 through 9. Preferably, one of the basic ether groups is in either the 2- or 3-position of the dibenzofuran ring system, while the remaining group is in either the 7- or 8-position, and most preferably one of these groups is in the 2-position and the other is in the 8-position.

Although one of the two X groups on a compound of the above general Formula I can be

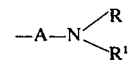

and the other can be the group

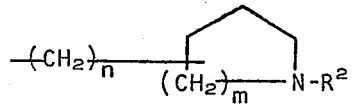

it is preferred that both X groups are the same as more fully shown by the following general Formulas II and III:

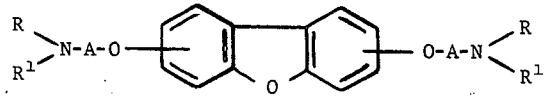

Formula II

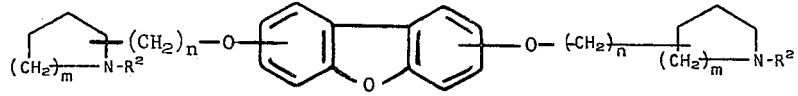

In the above general Formulas II and III, the various groups Y, A, R, R¹, R², $n$ and $m$ have the same meanings given hereinbefore.

Each of the symbols A in the above Formula II is an alkylene group having from 2 to 6 carbon atoms which can be straight chained, or branched chained, and which separates the ether oxygen from the amino nitrogen by an alkylene chain of at least 2 carbon atoms. Each of the alkylene groups represented by A can be the same or different, although preferably both of these groups are the same. Illustrative of alkylene groups represented by A there can be mentioned for example: 1,2-ethylene, 1,3-propylene, 1,4-butylene, 1,5-pentylene, 1,6-hexylene, 2-methyl-1,4-butylene, 2-ethyl-1,4-butylene, 3-methyl-1,5-pentylene and the like.

In the compounds of Formula II each amino group, that is,

can be a primary, secondary or tertiary amino group. Each R and R¹ is individually hydrogen, lower alkyl having from 1 to 6 carbon atoms, cycloalkyl of from 3 to 6 carbon atoms, alkenyl of from 3 to 6 carbon atoms and having the vinyl unsaturation in other than the 1-position of the alkenyl group, or each set of R and R¹ taken together with the nitrogen atom to which they are attached is a saturated monocyclic heterocyclic group. Preferably each of the

groups is a tertiary amino group.

Illustrative of lower alkyls which can be represented by each R or R¹ in the compounds of Formula II, or R² in the compounds of Formula III there can be mentioned straight or branched chain alkyls, such as, for example: methyl, ethyl, n-propyl, isopropyl, n-butyl, secondary butyl, tertiary butyl, n-pentyl, isoamyl, n-hexyl and the like.

Illustrative of cycloalkyl groups which can be represented by each R and R¹ in the compounds of Formula II of the present invention there can be mentioned for example, cyclopropyl, cyclobutyl, cyclopentyl and cyclohexyl.

Illustrative of alkenyl groups which can be represented by R, R¹, or R² of the compounds of the present invention there can be mentioned for example: allyl, 3-butenyl, 4-hexenyl and the like.

The heterocyclic groups which can be represented by each

group of Formula II are saturated monocyclic heterocyclic groups. These heterocyclic groups, in addition to the one nitrogen atom, can contain a second hetero atom, such as, for example, oxygen or nitrogen in the ring and 4 or 5 ring carbon atoms. The ring can be substituted with a lower alkyl group, particularly, with an alkyl group having from 1 to 3 carbon atoms. As examples of suitable heterocyclic groups which are represented by R and R¹ taken together with the nitrogen atom to which they are attached there can be mentioned for example, pyrrolidino, piperidino, morpholino, N-(lower)alkylpiperazino, such as, N-methyl- or N-ethylpiperazino and the like.

Each R, R¹ or R² group can be the same or different in each of the basic ether groups attached to the dibenzofuran ring system. Preferably, however, both of the R groups, R¹ groups or R² groups in each compound are the same. Preferred substituents for the R, R¹ and R² groups are alkyl radicals having from 1 to 6 carbon atoms.

Each of the saturated heterocyclic groups of the compounds of Formula III can be attached to oxygen through an alkylene linkage of 1 or 2 carbon atoms, for example, methylene or 1,2-ethylene, or each saturated heterocyclic group can be attached to oxygen through a ring carbon atom of the heterocyclic group when n is zero. The saturated heterocyclic group is attached to either the alkylene group or oxygen through a carbon atom of the ring by replacement of one of the hydrogen atoms of the ring. The heterocyclic groups in the compounds represented by Formula III can be 5- or 6-membered rings, that is, m is 1 or 2. As examples of various groups represented by

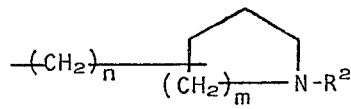

in the compounds of the present invention there can be mentioned for example: N-methyl-4-piperidyl, N-methyl-3-piperidyl, N-ethyl-3-pyrrolidyl, (N-methyl-4-piperidyl)methyl, (N-methyl-3-piperidyl)methyl, 2-(2-piperidyl)ethyl and the like.

As examples of base compounds of this invention which are represented by general Formula II there can be mentioned for example:

2,8-bis(4-aminobutoxy)dibenzofuran,
3,7-bis[2-(diethylamino)ethoxy]dibenzofuran,
2,8-bis[2-(diethylamino)ethoxy]dibenzofuran,
2,8-bis[2-(diisopropylamino)ethoxy]dibenzofuran,
2,8-bis[3-(diethylamino)propoxy]dibenzofuran,
2,8-bis[5-(di-n-propylamino)pentoxy]dibenzofuran,
2,8-bis[2-(diethylamino)-1-methylethoxy]dibenzofuran,
2,8-bis[3-(di-n-butylamino)propoxy]dibenzofuran,
2,8-bis[3-(dimethylamino)-2-methylpropoxy]dibenzofuran,
2,7-bis [3-(dimethylamino)propoxy]dibenzofuran,
1,7-bis[3-(dimethylamino)propoxy]dibenzofuran,
2,8-bis[3-(cyclohexylamino)propoxy]dibenzofuran,
2,8-bis[6-(diallylamino)hexoxy]dibenzofuran,
2,8-bis[3-(piperidino)propoxy]dibenzofuran and the like. As examples of base compounds of this invention which are represented by general Formula III there can be mentioned for example:
2,8-bis[2-(N-methyl-4-piperidyl)ethoxy]dibenzofuran,
2,8-bis(N-methyl-4-piperidyloxy)dibenzofuran,
3,7-bis[2-(N-methyl-4-piperidyl)ethoxy]dibenzofuran,
2,7-bis[2-(N-methyl-4-piperidyl)ethoxy]dibenzofuran,
2,8-bis(N-ethyl-3-pyrrolidyloxy)dibenzofuran,
1,7-bis[2-(N-methyl-4-piperidyl)ethoxy]dibenzofuran,
3,7-bis[(N-allyl-4-piperidyl)methoxy]dibenzofuran
and the like.

The pharmaceutically acceptable acid addition salts of the base compounds of this invention are those of any suitable inorganic or organic acids. Mono- or bis-acid addition salts can be formed, although in practice, the bis-salts are usually isolated. Also, the salts can be hydrated, for example, monohydrate, or substantially anhydrous. Suitable inorganic acids for preparing the salt form are, for example, mineral acids, such as, hydrochloric, hydrobromic, sulfuric or phosphoric acids and the like. Suitable organic acids are, for example, citric acid, malic acid, glycolic acid, lactic acid, tartaric acid, malonic acid, succinic acid, maleic acid, fumaric acid and the like.

The compounds of the present invention can be administered to prevent or inhibit infections of: picornaviruses, for example, encephalomyocarditis; myxoviruses, for example, Influenza $A_2$(Jap/305); arboviruses, for example, Semliki Forest; herpesvirus group, for example, herpes simplex; and poxviruses, for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment, and the nature of the effect desired. Illustratively, dosage levels of the administered active ingredients can be: intravenously, 0.1 to about 10 mg/kg; intraperitoneal, 0.1 to about 50 mg/kg; subcutaneous, 0.1 to about 250 mg/kg; orally, 0.1 to about 500 mg/kg and preferably about 1 to 250 mg/kg; intranasal instillation, 0.1 to about 10 mg/kg; and aerosol, 0.1 to about 10 mg/kg of animal body weight.

The compounds may be administered, dissolved or suspended, in any conventional non-toxic pharmaceutical carrier of the type that may be taken orally, applied topically, buccally or parenterally.

The compounds of the present invention may be prepared by various methods such as, for example, according to the methods described below in the several schemes illustrated by the equations and in the specific examples which follow.

Reaction Scheme 1

Reaction Scheme 2

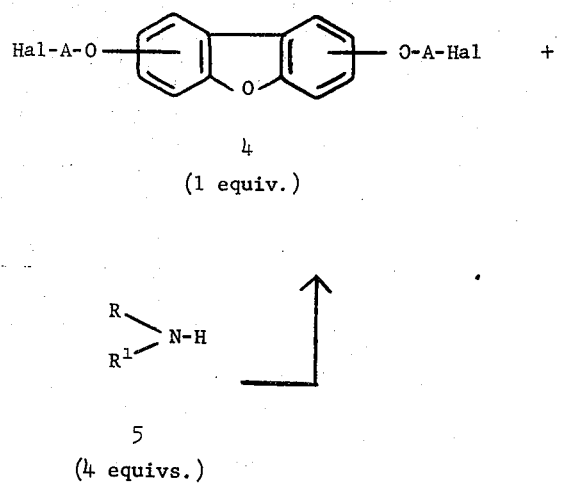

Reaction Scheme 3

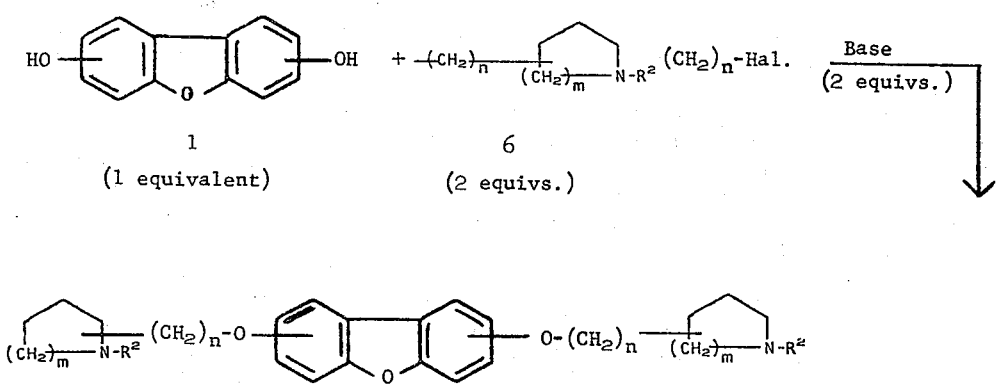

Formula III

In the above reaction schemes, $RR^1N-$, A, $R^2$, m, and n have the same meanings specified hereinbefore, and each Hal. is chlorine, bromine or iodine.

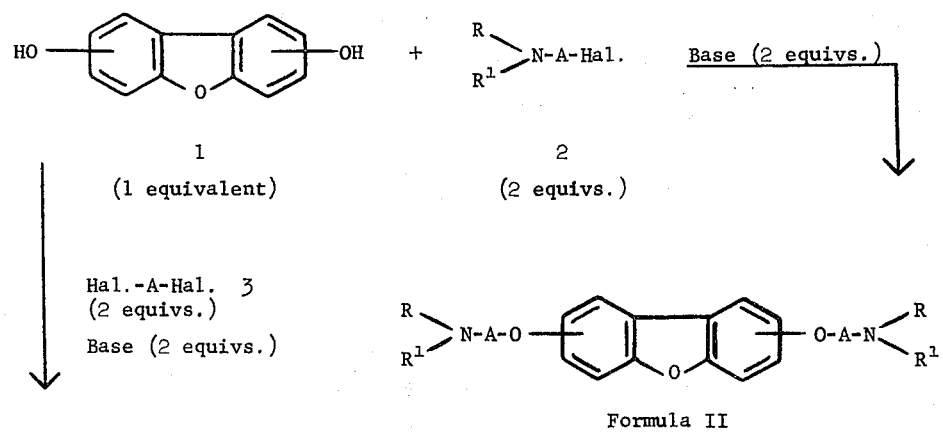

Formula II

Typical haloalkylamines, 2, useful in Reaction Scheme 1 are for example, N,N-diethyl-2-chloroethylamine, N-(2-chloroethyl)piperidine and the like. Typical dihaloalkanes, 3, useful in Scheme 2 are, for example, 1-bromo-2-chloroethane, 1,6-dibromohexane and the like. Amines, 5, useful in Scheme 2 are primary amines such as, for example, ethylamine, or secondary amines, such as, for example, dimethylamine, or tertiary amines, such as, for example, hexamethylenetetramine and the like. Typical of the halogen substituted heterocyclic nitrogen compounds, 6, useful in Scheme 2 are for example, 3-chloromethyl-1-methylpiperidine and the like.

In the above reaction schemes, the base used may be for example, sodium methoxide, sodium hydride, sodium amide, sodium hydroxide, potassium hydroxide and the like. Solvents used as the reaction medium may vary over a wide range of solvent types and include aromatic hydrocarbons such as benzene, toluene, xylene and the like; halogenated aromatics, such as chlorobenzene and the like, aprotic solvents such as N,N-dimethylformamide, N,N-dimethylacetamide, dimethyl sulfoxide and the like; alcohols such as ethanol, isopropyl alcohol and the like; ketones such as acetone, butanone and the like; ethers such as tetrahydrofuran, dioxane and the like; water; or mixtures of these solvents.

In the method of synthesis where either sodium methoxide, sodium amide or sodium hydride, for example, is used as the base, the reaction is carried out in an anhydrous medium, such as, anhydrous toluene, chlorobenzene and the like. About 2.5 equivalents of the base is added to a suspension of, 1 equivalent of dihydroxy dibenzofuran, compound 1, in the anhydrous solvent, and the mixture heated to form the diphenoxide. In the case where sodium methoxide is used, the methanol formed may be removed advantageously by azeotropic distillation. About 2.5 equivalents of the halide, 2, 3 or 6, is then added and the mixture heated to reflux for a period which may vary from about 4 to 24 hours. The products, that is, compounds of Formula II or III and compound 4 are then isolated by customary procedures. Compounds of Formula II and III are usually isolated as bis-acid addition salts.

In the method where an alkali hydroxide, such as potassium hydroxide, for example, is used as the base, two different procedures may be used. In the one procedure a 25 to 50 per cent aqueous solution of the alkali hydroxide (about 2.5 equivalents) is added to a suspension of 1 equivalent of compound 1 in a suitable aromatic solvent, such as, for example, xylene. This mixture is then heated to boiling with stirring and the water removed by azeotropic distillation, a convenient method being to collect the water in a device such as the Dean-Stark distilling receiver. The reaction mixture, now being essentially anhydrous, is treated with about 2.5 equivalents of the halide, compound 2, 3 or 6, as described above. In the other procedure the reaction is carried out in a heterogeneous medium of water and an aromatic hydrocarbon, such as, for example, toluene, xylene and the like. For example, 1 equivalent of compound 1 is suspended in the aromatic hydrocarbon. Then in Reaction Schemes 1 and 3, a solution of about 2.5 equivalents of a hydrohalide salt of the haloalkylamine, that is, a hydrohalide salt of 2 or 6, in the minimum volume of water is added, and with efficient stirring, a 25 to 50 per cent solution of the alkali hydroxide (about 5 equivalents) is added. The mixture is heated to reflux for a period of about 6 to 24 hours, and the product isolated from the hydrocarbon layer. In Scheme 2, when the aqueous aromatic hydrocarbon medium is used to prepare compounds of type 4, which contain no amine functions, the amount of alkali hydroxide used is only in slight excess of 2.0 equivalents per 1 equivalent of dihydroxy dibenzofuran, compound 1.

In Scheme 2, the reaction between the bis($\omega$-haloalkyl)ether, 4, and the amine, 5, may be carried out under a variety of conditions. For example, compound 4 may be heated together with a large excess of the amine, 5, the excess amine serving as both the reaction medium and the hydrohalide acceptor. This method is particularly suitable for readily available amines, the excess of which can be easily removed from the reaction mixture by, for example, distillation at reduced pressure or by steam distillation. Or, 1 equivalent of the bis($\omega$-haloalkyl)ether, 4, and 4 equivalents of the amine, 5, may be heated together in one of a number of different types of solvents, for example, in aromatic solvents, such as, benzene, toluene, xylene, chlorobenzene and the like; or lower molecular weight alcohols, such as, methanol, ethanol, isopropyl alcohol and the like; or lower molecular weight ketones, such as, acetone, butanone and the like. The reaction between the halo compound and the amine is usually promoted by the addition of either sodium or potassium iodide, the iodide being used in either catalytic or stoichiometric amounts. In some cases, it may be advantageous to use only two equivalents of the amine, 5, for each equivalent of the bis($\omega$-haloalkyl)ether, 4, an excess of either powdered sodium or potassium carbonate being used as the acceptor for the hydrohalide generated. In the case of volatile amines, this reaction may be best carried out under pressure in a suitable bomb or autoclave.

Reaction Scheme 4

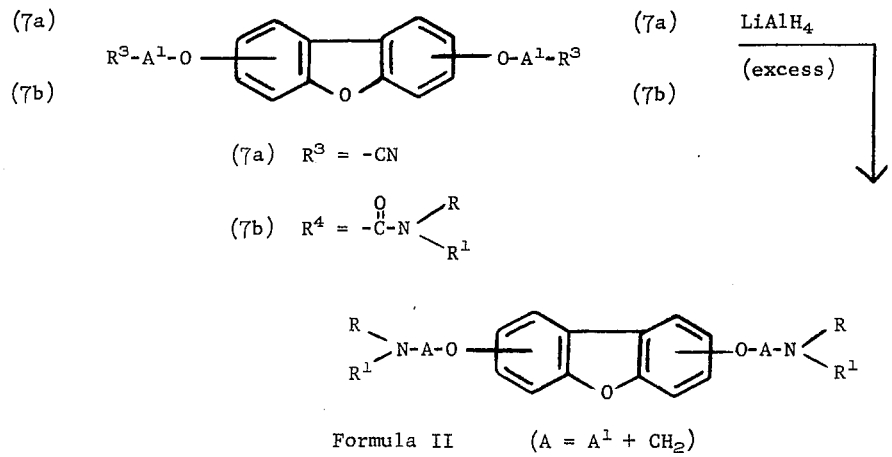

Formula II   (A = A$^1$ + CH$_2$)

In this scheme of synthesis, R, $R^1$ and A have the same meanings specified hereinbefore, and $A^1$ is an alkylene chain having one less methylene, —$CH_2$—, group in a straight chain than does A, that is, $A = A^1 + CH_2$.

The intermediate nitriles, (7a), and amides, (7b), may be prepared by the method illustrated, for example, in Reaction Scheme 1 above, in which the appropriate ω-haloalkyl nitriles and amides are substituted for the haloalkyl amines, 2.

According to the method of preparation illustrated in Reaction Scheme 4, compounds of Formula II, in which both R and $R^1$ are hydrogen, may be prepared from either the nitriles, (7a), or the unsubstituted amides, (7b), wherein $R = R^1 = H$. Secondary amines, that is, compounds of Formula II wherein R is H and $R^1$ is not H, can also often be prepared by this method from the corresponding secondary amides, (7b), wherein R is H and $R^1$ is not H.

appropriate acyl halides or anhydrides, followed by reduction of the N-acyl amines with lithium aluminum hydride.

Reductive alkylation of the primary amines with an excess of the appropriate aldehydes or ketones in the presence of molecular hydrogen and a catalyst, such as platinum or Raney nickel, for example, will yield the symmetrically substituted tertiary amines, that is, compounds of Formula II wherein $R = R^1$ but neither is H. Alkylation of the primary amines with formaldehyde and formic acid by the Eschweiler-Clarke procedure yields the tertiary amines of Formula II in which $R = R^1 = CH_3$.

Alkylation of the primary amines with a large excess of the appropriate halides yields the symmetrically substituted tertiary amines, that is, compounds of Formula II wherein $R = R^1$ but neither is H.

Alkylation of the secondary amines, that is, compounds of Formula II wherein R is H and $R^1$ is not H by the method illustrated in Scheme 5 may be used to Reaction Scheme 5

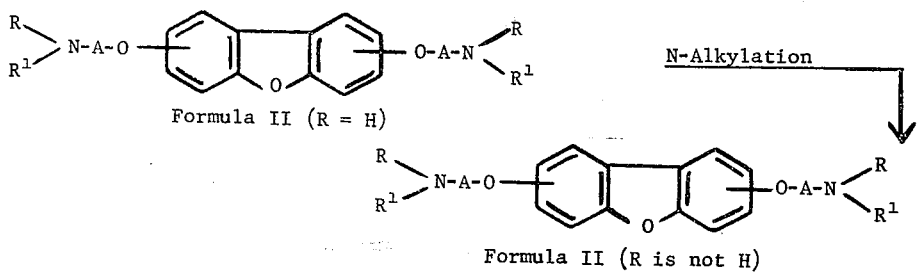

Formula II (R = H)

Formula II (R is not H)

In this scheme of synthesis, $R^1$ and A have the same meanings specified hereinbefore, and with the exceptions noted in the two formulas above, R has the same meaning specified hereinbefore.

Alkylation of the primary amines, that is, compounds of Formula II wherein each $R = R^1 = H$, by the method illustrated in Scheme 5 may be used to prepare either the secondary amines, that is, compounds of Formula II wherein R is H and $R^1$ is not H, or the symmetrically substituted tertiary amines, that is, compounds of Formula II wherein $R = R^1$ but neither is H.

One method for preparing the secondary amines, that is, compounds of Formula II wherein R is H and $R^1$ is not H, is the reaction of the primary amines, that is, compounds of Formula II wherein each $R = R^1 = H$ with the stoichiometric quantities of the appropriate aldehydes or ketones to yield the corresponding Schiff's bases, which may then be reduced with either a borohydride or molecular hydrogen in the presence of a catalyst, such as platinum or Raney nickel for example. Another method for preparing the secondary amines is acylation of the primary amines with the prepare either the symmetrically substituted tertiary amines, that is, compounds of Formula II wherein R and $R^1$ are different and neither is H.

Reaction of the secondary amines with the appropriate halides is one method for effecting N-alkylation. Another useful method is the reductive alkylation of the secondary amines with the appropriate aldehydes or ketones in the presence of molecular hydrogen and a catalyst, such as platinum or Raney nickel, for example. Another useful alkylation method is the two step method whereby the secondary amines are acylated with the appropriate acyl halides or anhydrides and the resulting N-acyl amines are reduced with lithium aluminum hydride to the corresponding tertiary amines. Alkylation of the secondary amines with formaldehyde and formic acid by the Eschweiler-Clarke procedure is a method for preparing the tertiary amines of Formula II in which $R = CH_3$.

Another useful method for preparing the bis-basic ethers represented by Formulas II and III is illustrated in Reaction Scheme 6.

Reaction Scheme 6

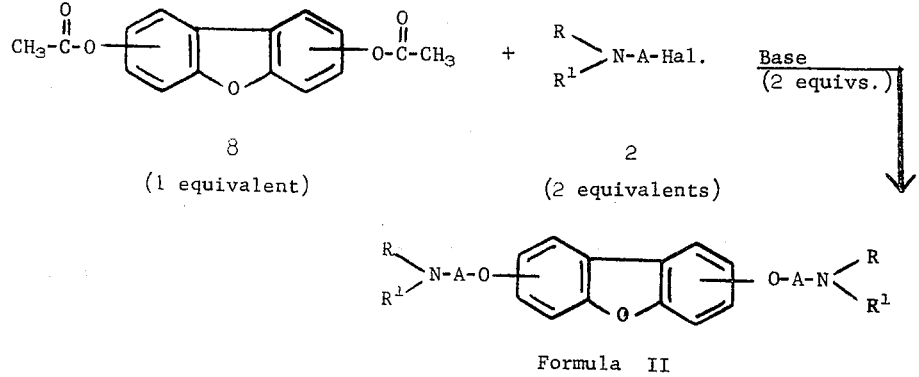

Formula II

This method is equally applicable to the preparation of bis-basic ethers represented by Formula III, in which case haloalkylamines of type 6 are substituted for the type 2 haloalkylamines shown in the above illustration.

By the method of Reaction Scheme 6, the bis-basic ethers can be prepared directly from the diacetates of dibenzofurandiols, compound 8, which in some cases are more conveniently isolated than are the diols, that is, compound 1, particularly, when the latter are relatively unstable or difficult to purify.

In this procedure it is often advantageous to use the hydrochloride salt of the haloalkylamine, 2 or 6, in place of the base form, in which case, the amount of base is doubled. Conveniently, the base used can be an alkali alkoxide, such as sodium methoxide, sodium ethoxide and the like. Solvents used in this procedure include aromatic hydrocarbons, such as benzene and toluene, and halogenated aromatics, such as chlorobenzene and the like. Reaction conditions can vary over a wide range with respect to the reaction period and temperature; however, the reaction is generally effected at the reflux temperature of the solvent for a period of 6 to 72 hours. The preferred method is to heat a mixture of compound 8, the hydrochloride salt of compound 2 or 6, and four molar equivalents of sodium methoxide in refluxing chlorobenzene for 24 hours.

Starting materials which find use in preparing the compounds illustrated in the above reaction schemes and in the specific examples given below are the following dibenzofuran-diols, that is, compound 1: 2,8-dihydroxydibenzofuran [N. Stjernstrom, Acta Chem. Scand., 14, 1274 (1960); 3,7-dihydroxydibenzofuran [Y. Asahina and M. Aoki, *J. Pharm. Soc. Japan*, 64, 41 (1944); C.A. 45, 2928]; 1,7-dihydroxydibenzofuran [C.A. Wachtmeister, *Acta Chem. Scand.*, 8, 1433 (1954)]; and 2,7-dihydroxydibenzofuran [K. Schimnelschmidt, *Ann.*, 566, 184 (1950)].

The diacetates, 8, can be prepared by acetylation of the above described diols, and the diacetate of 2,8-dihydroxydibenzofuran can be obtained directly in the Baeyer-Villiger oxidation of 2,8-diacetyldibenzofuran [C. Hassall, *Organic Reactions* 9, 73 (1957)].

Representative compounds of the present invention and several of the methods for preparing them, mentioned above, are illustrated in the following specific examples.

EXAMPLE 1

2,8-BIS[2(DIETHYLAMINO)ETHOXY]DIBENZOFURAN DIHYDROCHLORIDE

To 200 ml of water containing 13.0 g (0.33 mole) of sodium hydroxide and 12.0 g (0.06 mole) of 2,8-dihydroxydibenzofuran were added 250 ml of toluene and 26.0 g (0.15 mole) of 2-diethylaminoethyl chloride hydrochloride, and the heterogeneous reaction mixture was heated to reflux with stirring for 24 hours. When cool, the organic layer was washed with water, dried over magnesium sulfate then concentrated in vacuo. The remaining oily residue was dissolved in ether and treated with ethereal HCl to give the desired product which was recrystallized twice from methanol-ethyl acetate. M.P. 236.5°–283.5°C, $\lambda_{max}^{EtOH}$ 301, $E_{1cm}^{1\%}$ 430.

EXAMPLE 2

2,8-BIS(3-PIPERIDINOPROPOXY)DIBENZOFURAN DIHYDROCHLORIDE

Following the procedure of Example 1, only substituting for 2-diethylaminoethyl chloride hydrochloride, 29.7 g (0.15 mole) of 3-piperidinopropyl chloride hydrochloride, 2,8-bis(3-piperidinopropoxy)-dibenzofuran was obtained and subsequently converted to the dihydrochloride salt with ethereal HCl and recrystallized from methanol-ethylacetate. M.P. 245°–246.5°C, $\lambda_{max}^{EtOH}$ 303, $E_{1cm}^{1\%}$ 387.

Alternately, the desired product is obtained by the method described above with the exception that one-half the molar equivalent of sodium hydroxide is used with the base form of the amine, that is, 3-piperidinopropylchloride.

EXAMPLE 3

2,8-BIS[3-(DIETHYLAMINO)PROPOXY]DIBENZOFURAN

Following the procedure of Example 1, only substituting for 2-diethylaminoethyl chloride hydrochloride, 27.9 g (0.15 mole) of 3-diethylaminopropyl chloride hydrochloride, 2,8-bis [3-(diethylamino)-propoxy]-dibenzofuran was obtained as an oil after subsequent chromatography of the product on alumina using chloroform as the eluant. $\lambda_{max}^{EtOH}$ 305, $E_{1cm}^{1\%}$ 455.

EXAMPLE 4

2,8-BIS[3-(DIMETHYLAMINO)PROPOXY]DIBENZOFURAN DIHYDROCHLORIDE

To 400 ml of chlorobenzene were added 14.2 g (0.05 mole) of dibenzofuran-2,8-diol diacetate, 10.8 g (0.2 mole) of sodium methoxide and 15.8 g (0.1 mole) of 3-dimethylaminopropyl chloride hydrochloride. The mixture was heated to reflux with stirring for 24 hours, then cooled and filtered. The filtrate was washed with several portions of water and dried over magnesium sulfate. The chlorobenzene solution was evaporated in vacuo leaving an oily residue which was dissolved in ether and treated with ethereal HCl to give the dihydrochloride salt of the desired product which was recrystallized from methanol-ethyl acetate. M.P. 257°–258°C, $\lambda_{max}^{EtOH}$ 303, $E_{1cm}^{1\%}$ 437.

EXAMPLE 5

2,8-BIS(2-PIPERIDINOETHOXY)DIBENZOFURAN DIHYDROCHLORIDE

Following the procedure of Example 4 only substituting for 3-dimethylaminopropyl chloride hydrochloride, the appropriate molar equivalent amount of 2-piperidinoethyl chloride hydrochloride the desired product was obtained after recrystallization from methanol-ethyl acetate. M.P. 288°–289°C, $\lambda_{max}^{EtOH}$ 300, $E_{1cm}^{1\%}$ 393.

Alternately the desired product is obtained by the method described above with the exception that one-half the molar equivalent of sodium methoxide is used with the free base form of the amine, that is, 2-piperidinoethylchloride.

EXAMPLE 6

2,8-BIS[2-(DIMETHYLAMINO)-1-METHYLE-THOXY]DIBENZOFURAN BIS-DIHYDROGEN CITRATE

Following the procedure of Example 1 only substituting for 2-diethylaminoethyl chloride hydrochloride 23.7 g (0.15 mole) of 2-dimethylaminoisopropyl chloride hydrochloride the free base of 2,8-bis[2-(dimethylamino)-1-methylethoxy]dibenzofuran was obtained and subsequently treated with a methanol solution of citric acid to give the desired product which was recrystallized twice from methanol-acetone. M.P. 120°–122°C, $\lambda_{max}^{H_2O}$ 299, $E_{1cm}^{1\%}$ 241.

EXAMPLE 7

2,8-BIS(2-PYRROLIDINOETHOXY)DIBENZOFURAN DIHYDROCHLORIDE

Following the procedure of Example 4 only substituting for 3-dimethylaminopropyl chloride hydrochloride, 17.0 g (0.1 mole) of N-(β-chloroethyl)pyrrolidine hydrochloride, the desired product was obtained and recrystallized twice from methanol-acetone. M.P. 257°–259°C, $\lambda_{max}^{H_2O}$ 298, $E_{1cm}^{1\%}$ 408.

EXAMPLE 8

2,8-BIS[3-(DIMETHYLAMINO)-2-METHYL-PROPOXY]DIBENZOFURAN DIHYDROCHLORIDE

Following the procedure of Example 4 only substituting for 3-dimethylaminopropyl chloride hydrochloride, 17.2 g (0.1 mole) of 3-dimethylamino-2-methylpropyl chloride hydrochloride the desired product was obtained and recrystallized three times from methanol-acetone. M.P. 126°–128°C, $\lambda_{max}^{H_2O}$ 300, $E_{1cm}^{1\%}$ 368

EXAMPLE 9

2,8-BIS[2-(DIISOPROPYLAMINO)ETHOXY]-DIBENZOFURAN

Following the procedure of Example 4 only substituting for 3-dimethylaminopropyl chloride hydrochloride, 20.0 g (0.1 mole) of 2-diisopropylaminoethyl chloride hydrochloride, the desired product was obtained after chromatography on alumina using chloroform as the eluant. M.P. 47°–49°C, $\lambda_{max}^{EtOH}$ 303, $E_{1cm}^{1\%}$ 443.

EXAMPLE 10

3,7-BIS(2-DIETHYLAMINOETHOXY)DIBENZOFURAN DIHYDROCHLORIDE

Following the procedure of Example 1 only substituting for 2,8-dihydroxydibenzofuran, 3,7-dihydroxydibenzofuran the desired product is obtained,

EXAMPLE 11

2,8-BIS(2-DIHEXYLAMINOETHOXY)DIBENZOFURAN DIHYDROCHLORIDE

Following the procedure of Example 1 only substituting for 2-diethylaminoethyl chloride hydrochloride, 42.6 g (0.15 mole) of 2-hexylaminoethyl chloride hydrochloride the desired product is obtained.

EXAMPLE 12

2,8-BIS[2-(ETHYLAMINO)ETHOXY]DIBENZOFURAN DIHYDROCHLORIDE

A. With stirring, 80 ml. of 10% aqueous sodium hydroxide is added dropwise, over a period of thirty minutes, to a mixture of 0.1 mole of 2,8-dihydroxydibenzofuran and 0.3 mole of 1-bromo-2-chloroethane in 400 ml. of water. With continued stirring, the mixture is then heated to reflux for 18 hours. When cool, the supernatant water layer is decanted and the residue dissolved in boiling ethanol. The solid which separates on cooling is filtered and recrystallized from ethanol-chloroform to yield 2,8-bis(2-chloroethoxy)dibenzofuran.

B. A mixture of 0.05 mole of 2,8-bis(2-chloroethoxy)dibenzofuran, 1.0 mole of ethylamine, 2.0 g of potassium iodide and 100 ml. of tetrahydrofuran is heated with stirring at 110° for 24 hours in a Parr pressure reactor. The solvent and excess amine are removed in vacuo. The residue is treated with dilute sodium hydroxide and extracted with ether. The ether layer is washed twice with water, dried over anhydrous magnesium sulfate and acidified with ethereal HCl to give 2,8-bis[2-(ethylamino)ethoxy]dibenzofuran dihydrochloride which is recrystallized from methanol-ethyl acetate.

EXAMPLE 13

2,8-BIS(2-AMINOETHOXY)DIBENZOFURAN DIHYDROCHLORIDE

Following the procedure of Example 12 (B), only substituting for ethylamine the appropriate molar equivalent amount of hexamine the desired product is obtained after subsequent decomposition of the intermediate quaternary ammonium complex with dilute acid.

EXAMPLE 14

2,8-BIS(6-DIETHYLAMINOHEXYLOXY)DIBENZOFURAN DIHYDROCHLORIDE

Following the procedure of Example 12 (A), only substituting for 2-bromo-1-chloroethane, the appropriate molar equivalent amount of 6-bromo-1-chlorohexane, the intermediate, 2,8-bis(6-chlorohexyloxy)dibenzofuran, is prepared. Upon reacting this intermediate with an excess of diethylamine by the procedure of Example 12 (B) the desired product is obtained.

EXAMPLE 15

Following the procedure of Example 1 only substituting for 2,8-dihydroxydibenzofuran, 1,7- and 2,7-dihydroxydibenzofuran, the following compounds are obtained:

1,7-Bis(2-diethylaminoethoxy)dibenzofuran
2,7-Bis(2-diethylaminoethoxy)dibenzofuran.

EXAMPLE 16

2,8-BIS(1-ETHYL-3-PIPERIDYLOXY)DIBENZOFURAN DIHYDROCHLORIDE

Following the procedure of Example 1, only substituting for 2-diethylaminoethylchloride hydrochloride the appropriate molar equivalent amount of 3-chloro-N-ethylpiperidine hydrochloride the product is obtained.

EXAMPLE 17

By the procedure of Example 4 only substituting for 3-dimethylaminopropyl chloride hydrochloride, the appropriate molar equivalent amounts of N-(2-chloroethyl)morpholine hydrochloride and N-(2-chloroethyl)-N'-methylpiperazine hydrochloride the following compounds are prepared:
2,8-Bis(2-morpholinoethoxy)dibenzofuran dihydrochloride
2,8-Bis[2-N-methylpiperazino)ethoxy]dibenzofuran tetrahydrochloride.

What is claimed is:

1. A compound selected from a base of the formula

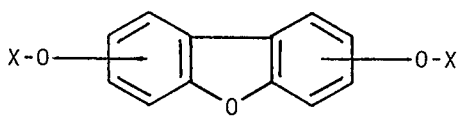

wherein each X is a member selected from the group consisting of
A. the group

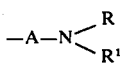

wherein each A is an alkylene chain having from 2 to 6 carbon atoms and which separates the amino nitrogen and [Y] the ether oxygen by at least 2 carbon atoms; R and $R^1$ are individually selected from the group consisting of hydrogen, lower alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or each set of R and $R^1$ taken together with the nitrogen atom to which they are attached is a saturated monocyclic heterocyclic group selected from pyrrolidino, piperidino, morpholino, or N-(lower)alkylpiperazino;or
B. the group

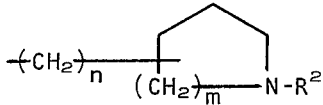

wherein $n$ is a whole integer of from 0 to 2, $m$ is 1 or 2, and $R^2$ is a member selected from the group consisting of hydrogen, lower alkyl having from 1 to 6 carbon atoms, or alkenyl of 3 to 6 carbon atoms and having the vinyl unsaturation in other than the 1-position of the alkenyl group;
r a pharmaceutically acceptable acid addition salt of aid base.

2. A compound of claim 1 wherein one of the –O—X groups is in either the 2- or 3-position of the ibenzofuran ring system and the other such group is in ither the 7- or 8-position.

3. A compound of claim 2 wherein X is the group

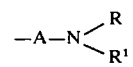

wherein each A is an alkylene chain having from 2 to 6 carbon atoms and which separates the amino nitrogen and oxygen by at least 2 carbon atoms; R and $R^1$ are individually selected from the group consisting of hydrogen, lower alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or each set of R and $R^1$ taken together with the nitrogen atom to which they are attached is a saturated monocyclic heterocyclic group selected from pyrrolidino, piperidino, morpholino, or N-(lower)alkylpiperazino; or a pharmaceutically acceptable acid addition salt of said base.

4. A compound of claim 3 wherein each R and $R^1$ is lower alkyl having from 1 to 6 carbon atoms, or each set of R and $R^1$ taken together with the nitrogen atom to which they are attached is a saturated monocyclic heterocyclic group such as pyrrolidino or piperidino; or a pharmaceutically acceptable acid addition salt thereof.

5. A compound of claim 4 which is 2,8-bis[2-(diethylamino)-ethoxy]dibenzofuran or a pharmaceutically acceptable acid addition salt thereof.

6. A compound of claim 4 which is 2,8-bis[3-(diethylamino)-propoxy]dibenzofuran or a pharmaceutically acceptable acid addition salt thereof.

7. A compound of claim 4 which is 2,8-bis[3-(dimethylamino)-propoxy]dibenzofuran or a pharmaceutically acceptable acid addition salt thereof.

8. A compound of claim 4 which is 2,8-bis[2-(diisopropylamino)ethoxy]dibenzofuran or a pharmaceutically acceptable acid addition salt thereof.

9. A compound of claim 4 which is 2,8-bis(2-piperidinoethoxy)-dibenzofuran or a pharmaceutically acceptable acid addition salt thereof.

10. A compound of claim 4 which is 2,8-bis(3-piperidinopropoxy)dibenzofuran or a pharmaceutically acceptable acid addition salt thereof.

11. A compound of claim 4 which is 2,8-bis[3-(dimethylamino)-2-methylpropoxy]dibenzofuran or a pharmaceutically acceptable acid addition salt thereof.

12. A compound of claim 2 wherein each X is the group

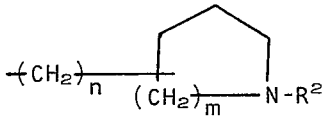

wherein $n$ is a whole integer of from 0 to 2, $m$ is 1 or 2, and $R^2$ is a member selected from the group consisting of hydrogen, or lower alkyl having from 1 to 6 carbon atoms; or a pharmaceutically acceptable acid addition salt thereof.

13. A compound of claim 12 wherein $R^2$ is lower alkyl having from 1 to 4 carbom atoms.

* * * * *

UNITED STATES PATENT OFFICE
CERTIFICATE OF CORRECTION

Patent No. 3,929,802            Dated December 30, 1975

Inventor(s) William L. Albrecht et al.

It is certified that error appears in the above-identified patent and that said Letters Patent are hereby corrected as shown below:

Columns 1 and 2, lines 45 to 50, after the structural formula insert -- III --.

Column 15, lines 34 and 35, "amino nitrogen and [Y] the ether"

should read -- amino nitrogen and the ether --.

Signed and Sealed this

Nineteenth Day of April 1977

[SEAL]

Attest:

RUTH C. MASON  
*Attesting Officer*

C. MARSHALL DANN  
*Commissioner of Patents and Trademarks*